US011612896B2

(12) United States Patent
Ibi et al.

(10) Patent No.: US 11,612,896 B2
(45) Date of Patent: Mar. 28, 2023

(54) SEPARATION DEVICE

(71) Applicant: SINTOKOGIO, LTD., Nagoya (JP)

(72) Inventors: Yusuke Ibi, Nagoya (JP); Hiroaki Suzuki, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 15 days.

(21) Appl. No.: 17/473,637

(22) Filed: Sep. 13, 2021

(65) Prior Publication Data

US 2022/0118462 A1 Apr. 21, 2022

(30) Foreign Application Priority Data

Oct. 19, 2020 (JP) .............................. JP2020-175073

(51) Int. Cl.
*B03C 1/14* (2006.01)
*B07B 9/02* (2006.01)
(Continued)

(52) U.S. Cl.
CPC .................. *B03C 1/14* (2013.01); *B07B 4/02* (2013.01); *B07B 9/02* (2013.01); *B24C 9/00* (2013.01); *B03C 2201/20* (2013.01)

(58) Field of Classification Search
CPC .... B03C 1/10; B03C 1/12; B03C 1/14; B03C 1/26; B03C 1/30; B03C 1/247;
(Continued)

(56) References Cited

U.S. PATENT DOCUMENTS

| 500,604 | A | * | 7/1893 | Payne | ....................... B03C 1/14 |
| | | | | | 209/214 |
| 1,290,895 | A | * | 1/1919 | Bryan | ....................... B03C 1/23 |
| | | | | | 209/137 |

(Continued)

FOREIGN PATENT DOCUMENTS

| CN | 104723225 | A | * | 6/2015 | ............... B03C 1/02 |
| CN | 106799306 | A | * | 6/2017 |

(Continued)

*Primary Examiner* — Gene O Crawford
*Assistant Examiner* — Muhammad Awais
(74) *Attorney, Agent, or Firm* — Oliff PLC

(57) ABSTRACT

A separation device that separates a mixture of magnetic bodies that are granular and non-magnetic bodies that is granular into the magnetic bodies and the non-magnetic bodies. The separation device includes a magnetic force separating mechanism, a wind force generation portion, a first wind force separating portion, and a second wind force separating portion. The magnetic force separating mechanism separates the mixture into first separated objects and second separated objects by attracting the magnetic bodies from the mixture of magnetic force. The first separated objects mainly contain the magnetic and non-magnetic bodies. The second separated objects mainly contain the non-magnetic bodies and magnetic bodies. The wind force generation portion generates wind force. The first wind force separates the first separated objects into the magnetic and non-magnetic bodies of wind force. The second wind force separates the second separated objects into the non-magnetic bodies and magnetic bodies of wind force.

15 Claims, 9 Drawing Sheets

(51) Int. Cl.
*B24C 9/00* (2006.01)
*B07B 4/02* (2006.01)

(58) Field of Classification Search
CPC ......... B03C 2201/20; B07B 4/02; B07B 4/06;
B07B 9/02; B24C 9/00; B24C 9/003;
B24C 9/006; B24C 3/02; B22D 31/002
USPC .......................................................... 209/39
See application file for complete search history.

(56) References Cited

U.S. PATENT DOCUMENTS

| | | | | |
|---|---|---|---|---|
| 3,368,677 | A * | 2/1968 | Bradley, Jr. ............. | B24B 55/06 |
| | | | | 209/33 |
| 4,753,052 | A * | 6/1988 | Dickson .................. | B24C 3/067 |
| | | | | 451/92 |
| 2019/0143373 | A1 * | 5/2019 | Sugiura ................... | B07B 9/00 |
| | | | | 209/39 |

FOREIGN PATENT DOCUMENTS

| | | | | | |
|---|---|---|---|---|---|
| CN | 107921483 | A | * | 4/2018 | ........... B01D 33/073 |
| CN | 210753203 | U | * | 6/2020 | |
| DE | 4339532 | A1 | * | 8/1994 | ............... B03C 1/02 |
| DE | 202012010543 | U1 | * | 3/2014 | ............... B03C 1/14 |
| FR | 2698020 | A1 | * | 5/1994 | ............. B07B 11/06 |
| GB | 346481 | A | * | 4/1931 | |
| JP | 2001137827 | A | * | 5/2001 | ............. B03C 1/247 |
| WO | WO-0240171 | A1 | * | 5/2002 | ............. B03C 1/247 |
| WO | 2017/212898 | A1 | | 12/2017 | |

* cited by examiner

SEPARATION DEVICE

TECHNICAL FIELD

The present invention relates to a separation device.

BACKGROUND ART

In some cases, magnetic bodies that are granular may need to be separated from non-magnetic bodies that are granular.

For example, in blast-processing, magnetic bodies that are granular (so-called blasting abrasives) are projected or injected (herebelow simply written as projected). In blast-processing, post-casting shake-out and the like are performed in casting by projecting magnetic bodies. When the magnetic bodies are projected at the workpiece surface, non-magnetic particles such as sand adhered to the workpiece surface are removed from the workpiece. After blast-processing is performed, the magnetic bodies and the non-magnetic bodies are discharged in a mixed state. For the separating of magnetic bodies and non-magnetic bodies that are discharged in a mixed state in this manner, magnetic force and wind force, for example, are used. Magnetic bodies that have been separated are reused for blast-processing. In addition, of the magnetic bodies that have been separated, those that no longer have a size suitable for reuse due to, for example, wear and fracture caused by colliding with the workpiece are removed.

For example, Patent Document 1 discloses a separation device that separates magnetic bodies (blasting abrasives) from a mixture containing the magnetic bodies and granular foreign matter. This separation device has a magnetic force separating mechanism that separates the magnetic bodies from the mixture by means of magnetic force. The magnetic force separating mechanism has a rotating drum, a magnet, and a guide portion. The rotating drum is cylindrical and is rotationally driven in one direction about an axis. The magnet is disposed inside the rotating drum at least in a region corresponding to a range extending from one lateral zone to a bottom end side of the rotating drum. The guide portion is disposed opposing and spaced apart from one lateral zone of the rotating drum.

The magnetic force separating mechanism separates the mixture into the magnetic bodies and the non-magnetic foreign matter (molding sand) using the force of the magnet. The magnetic force separating mechanism separates the mixture that was supplied to the one lateral zone in the rotating drum into objects (foreign matter) that fall from between the guide portion and the rotating drum before reaching the bottom end side of the rotating drum and objects (magnetic bodies) that are attracted by the magnetic force of the magnet. In order to improve the separating accuracy of the magnetic bodies and foreign matter, Patent Document 1 discloses the configuration in which a wind force separating mechanism that separates the magnetic bodies from the mixture by means of wind force is further provided. The wind force separating mechanism uses the force of wind to further separate the objects that were attracted by the magnetic force of the magnet in the magnetic force separating mechanism into reusable magnetic bodies and foreign matter that was not able to be successfully separated by the magnetic force separating mechanism.

CITATION LIST

Patent Literature

Patent Document 1: WO 2017/212898 A

SUMMARY OF INVENTION

Technical Problem

Even with the configuration of Patent Document 1, the mixture can be separated into reusable magnetic bodies and non-magnetic bodies. However, greater improvement of the separating accuracy is desired. In order to more reliably separate magnetic bodies and non-magnetic bodies, it is contemplated that, for example, a magnetic force separating mechanism is further added and the objects that were separated as non-magnetic bodies are further separated in this magnetic force separating mechanism. However, this incurs equipment costs, running costs, energy costs, and the like.

It is an objective of the present invention to provide a separation device that can separate magnetic bodies and non-magnetic bodies more reliably while suppressing an increase in costs.

Solution to Problem

One aspect of the present invention is a separation device that separates a mixture of granular magnetic bodies and granular non-magnetic bodies into the magnetic bodies and the non-magnetic bodies. This separation device comprises a magnetic force separating mechanism, a wind force generation portion, a first wind force separating portion, and a second wind force separating portion. The magnetic force separating mechanism attracts the magnetic bodies from the mixture by means of magnetic force to separate the mixture into first separated objects and second separated objects. The first separated objects mainly contain the magnetic bodies and also contain the non-magnetic bodies. The second separated objects mainly contain the non-magnetic bodies and also contain the magnetic bodies. The wind force generation portion generates wind force. The first wind force separating portion separates the first separated objects into the magnetic bodies and the non-magnetic bodies by means of the wind force. The second wind force separating portion separates the second separated objects into the non-magnetic bodies and the magnetic bodies by means of the wind force. The first wind force separating portion and the second wind force separating portion are disposed next to each other along a flow path of wind that is generated by the wind force generation portion.

Effects of Invention

According to one aspect of the present invention, it is possible to more reliably separate magnetic bodies and non-magnetic bodies that are granular while suppressing an increase in costs.

DESCRIPTION OF EMBODIMENTS

Embodiments for carrying out the separation device according to the present invention will be explained by referring to the attached drawings.

The separation device separates a mixture of granular magnetic bodies and granular non-magnetic bodies into the magnetic bodies and the non-magnetic bodies. The separation device of the present embodiment separates blasting abrasives, which are magnetic bodies, and non-magnetic bodies, which have been stripped from a workpiece and have less mass than the magnetic bodies, from a mixture discharged from a blast-processing device and containing the magnetic bodies and the blasting abrasives, as described below. However, the separation device can be used for other objectives aside from the objective of separating mixtures that are discharged from a blast-processing device. Therefore, the magnetic bodies may not only be blasting abrasives but also other substances having magnetic properties.

Figure 1:
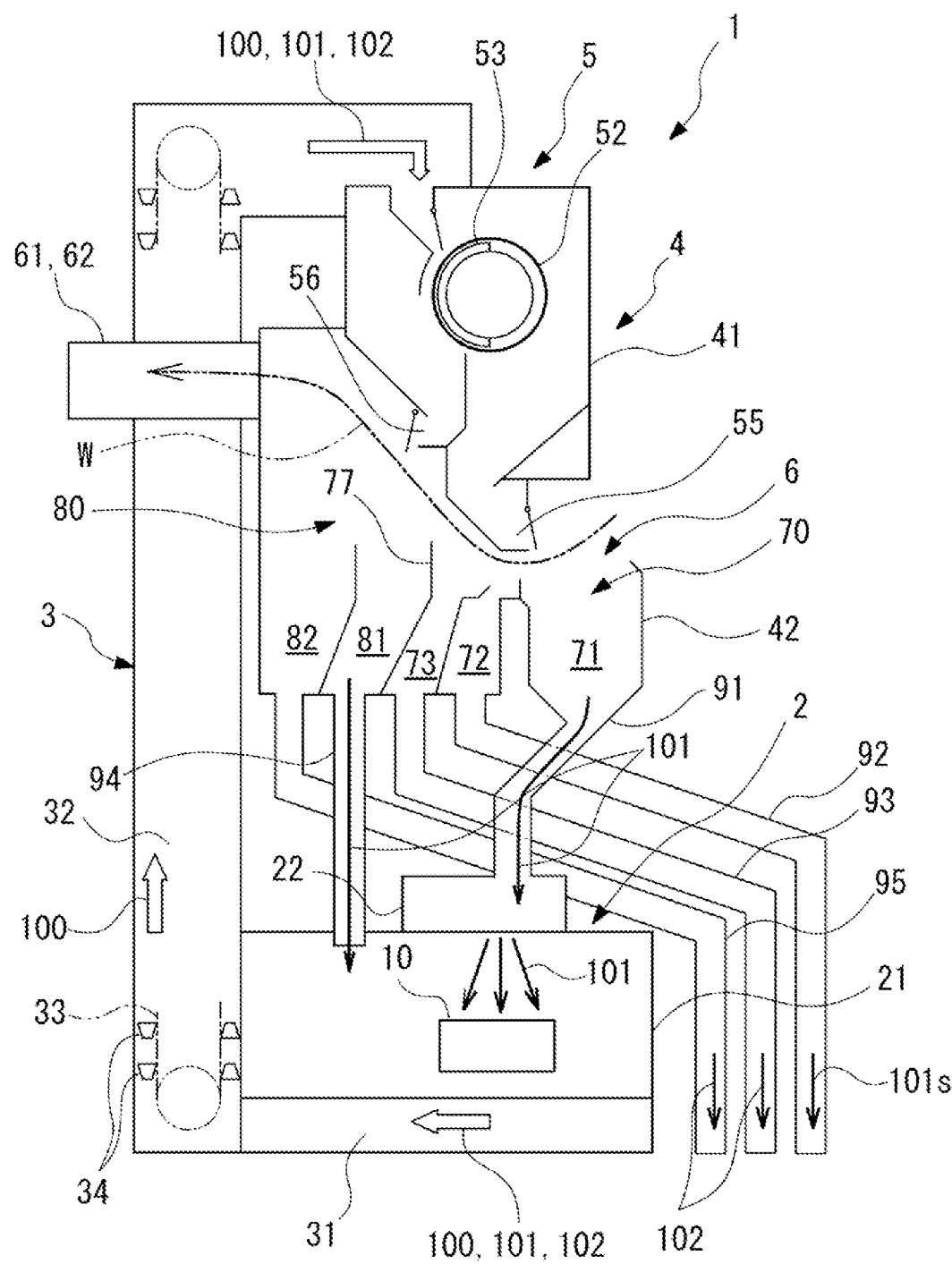
FIG. 1 is a schematic cross-sectional view illustrating the configuration of a blast-processing device comprising the separation device according to the present embodiment.

As illustrated in FIG. 1, blast-processing equipment 1 mainly comprises a blast-processing device 2, a circulation portion 3, and a separation device 4.

The blast-processing device 2 subjects a workpiece 10 to blast-processing by projecting magnetic particles (hereinafter referred to as magnetic bodies 101; blasting abrasives in the present embodiment) at the workpiece 10. The blast-processing device 2 comprises a projection chamber 21 and a projector 22. The projection chamber 21 houses therein the workpiece 10 to be blast-processed. The projector 22 is disposed above the projection chamber 21. The projector 22 projects the magnetic bodies 101 toward the workpiece 10 inside the projection chamber 21. The magnetic bodies 101 are in granular form comprising magnetic bodies such as cast steel and cast iron. The magnetic bodies 101 have a particle diameter of, for example, 0.1 to 2.5 mm.

The workpiece 10 is subjected to predetermined blast-processing by such magnetic bodies 101 being projected at the workpiece 10. When the magnetic bodies 101 are projected at the workpiece 10, for example, non-magnetic bodies 102 adhered to the workpiece 10 are stripped from the workpiece 10. When, for example, the workpiece 10 is a cast article that was formed by means of sand casting, these non-magnetic bodies 102 are molding sand constituting the sand mold covering the cast article. The projected magnetic bodies 101 and the granular non-magnetic bodies 102 generated by the blast-processing fall to the lower portion of the projection chamber 21. That is, the blast-processing device 2 discharges a granular mixture 100 containing the magnetic bodies 101 and the non-magnetic bodies 102.

The circulation portion 3 circulates the mixture 100 that is discharged from the blast-processing device 2 to the separation device 4. The circulation portion 3 comprises a screw conveyor 31 and a bucket elevator 32.

The screw conveyor 31 is disposed at the lower portion of the projection chamber 21. The screw conveyor 31 conveys the mixture 100 that has fallen from the projection chamber 21 to the bucket elevator 32.

The bucket elevator 32 has a configuration in which a plurality of buckets 34 is provided to an endless chain or belt 33. The bucket elevator 32 sequentially scoops up the mixture 100 that has been conveyed by the screw conveyor 31 with the plurality of buckets 34 by driving the chain or belt 33 to circulate the chain or belt 33. The buckets 34 convey the scooped-up mixture 100 upward. The mixture 100 that has been conveyed upward by the buckets 34 is dumped from the buckets 34 onto a chute (not shown) at the upper end of the bucket elevator 32. The mixture 100 that has been dumped onto the chute is supplied to the separation device 4.

Figure 2:
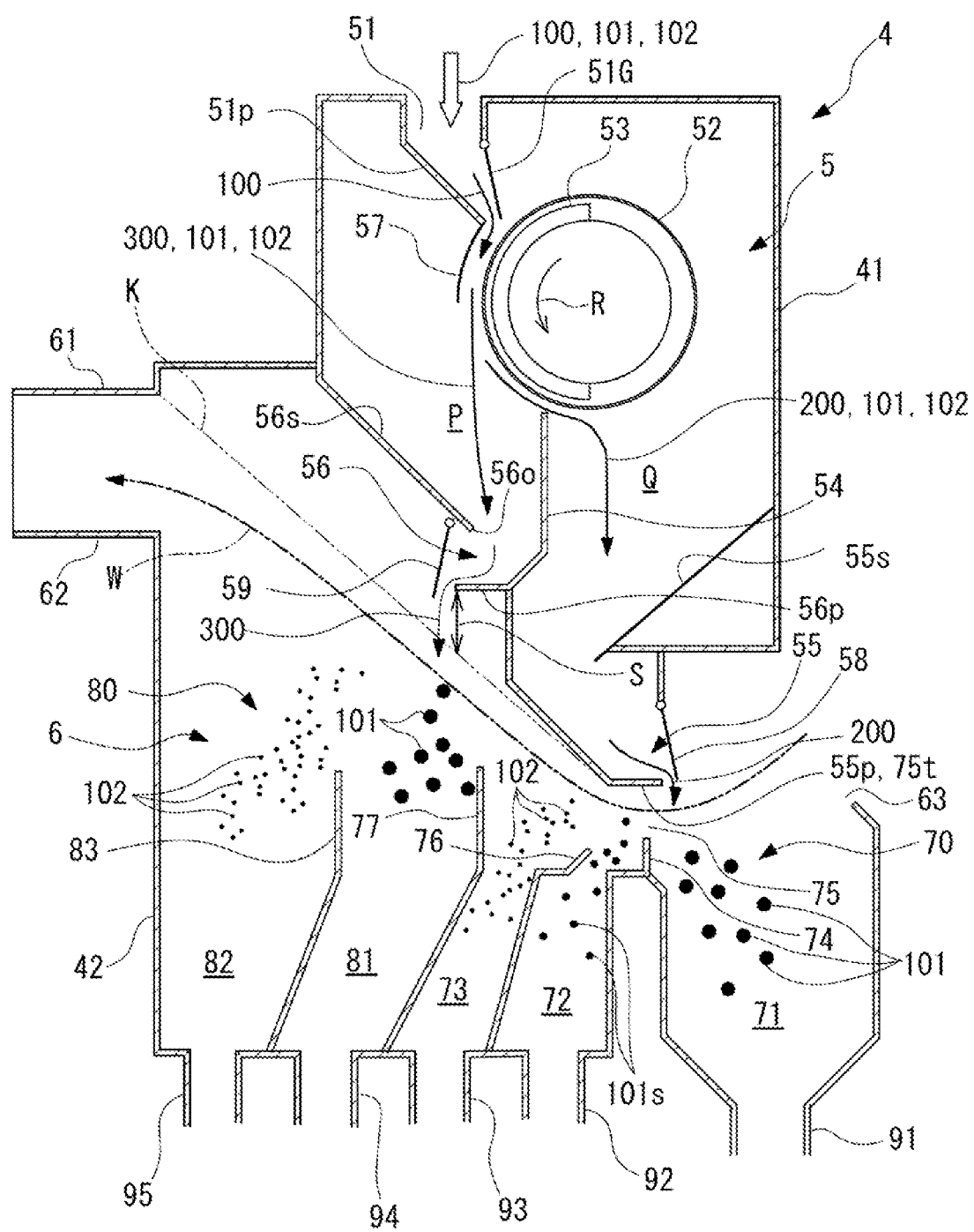
FIG. 2 is a cross-sectional view illustrating the overall configuration of the separation device according to the present embodiment.

As illustrated in FIG. 2, the separation device 4 separates the mixture 100 of the magnetic bodies 101 and the non-magnetic bodies 102 into the magnetic bodies 101 and the non-magnetic bodies 102. The separation device 4 comprises a magnetic force separating mechanism 5 and a wind force separating mechanism 6.

The magnetic force separating mechanism 5 is disposed inside a first separating chamber 41 formed at the upper portion of the separation device 4. The magnetic force separating mechanism 5 mainly comprises a mixture supply portion 51, a rotating drum 52, a magnet 53, a partition 54, a first separated object supply portion 55, and a second separated object supply portion 56.

The mixture supply portion 51 receives the mixture 100 from a chute (not shown) of the circulation portion 3. The mixture supply portion 51 supplies the mixture 100 to the rotating drum 52. The mixture supply portion 51 comprises an inclined plate 51p and an adjustment gate 51G.

The inclined plate 51p is inclined so as to approach the rotating drum 52 from above downward. The mixture 100 is supplied from the chute (not shown) onto the inclined plate 51p. The mixture 100 that has been supplied sequentially and naturally falls along the inclined plate 51p.

The adjustment gate 51G is disposed above the bottom end of the inclined plate 51p. The adjustment gate 51G is configured to be swingable about a rotation axis extending in a direction orthogonal to the paper plane in FIG. 2. The adjustment gate 51G is configured such that the size of a gap between the adjustment gate 51G and the inclined plate 51p can be adjusted by modifying the swing angle by means of an adjustment screw (not shown) and the like. By adjusting the size of the gap, the adjustment gate 51G adjusts the flow rate of the mixture 100 that is supplied from the mixture supply portion 51 to the rotating drum 52.

A guide plate 57 is disposed below the inclined plate 51p. The guide plate 57 is disposed to be continuous with the lower end of the inclined plate 51p. The guide plate 57 is spaced apart a predetermined distance on the outer side in the radial direction of the rotating drum 52 relative to the outer surface of the rotating drum 52. The guide plate 57 is formed in an arc shape concentric with the outer surface of the rotating drum 52.

The rotating drum 52 forms a cylindrical shape extending along a central axis orthogonal to the paper plane in FIG. 2. The rotating drum 52 is disposed such that the outer surface at the upper portion of the rotating drum 52 is located on an extended line of the adjustment gate 51G. The rotating drum 52 is rotationally driven in a predetermined direction R about the central axis by a suitable drum rotation mechanism (not shown) comprising a motor, reduction gears, and the like.

The magnet 53 is disposed inside the rotating drum 52. The magnet 53 is disposed so as to be continuous in an arc shape along the inner surface of the rotating drum 52. In the present embodiment, the magnet 53 is fixed so as to impart a magnetic attractive force to a semicircular arc-shaped area from the top portion of the rotating drum 52 through the lateral zone on the side of the inclined plate 51p and the guide plate 57 down to the bottom end of the rotating drum 52. The magnet 53 is non-movably fixed and when the rotating drum 52 is rotationally driven, the rotating drum 52 rotates and moves relative to the magnet 53.

The partition 54 is disposed below the rotating drum 52. The partition 54 extends in the up-down direction. The upper end of the partition 54 is disposed so as to be spaced apart in the up-down direction from the outer surface of the rotating drum 52.

In such a magnetic force separating mechanism 5, the mixture 100 is supplied to the mixture supply portion 51 during rotational motion of the rotating drum 52. The mixture 100 slides down along the inclined plate 51p and is supplied from the gap between the inclined plate 51p and the adjustment gate 51G to an area contacting the outer surface of the rotating drum 52.

Of the mixture 100 that has contacted the rotating drum 52, the magnetic bodies 101 and the like are magnetically attracted to the outer surface of the rotating drum 52 by the magnetic force of the magnet 53. The magnetically attracted magnetic bodies 101 are conveyed with the rotation of the rotating drum 52 in the direction of arrow R. At this time, non-magnetic bodies 102 can become trapped (sandwiched) between the many magnetic bodies 101 that were magnetically attracted to the outer surface of the rotating drum 52. For this reason, some non-magnetic bodies 102 are held along with the magnetic bodies 101 on the outer surface of the rotating drum 52. After the magnetic bodies 101 and some of the non-magnetic bodies 102 held on the outer surface of the rotating drum 52 in this manner are conveyed to the bottom end of the rotating drum 52, which is the limit to which the magnet 53 can impart a sufficient magnetic attractive force, the magnetic attraction is released. The magnetic bodies 101 that have been released from the magnetic attraction separate from the outer surface of the rotating drum 52 and naturally fall into a conveyed falling area Q along with some of the trapped non-magnetic bodies 102. The conveyed falling area Q is located on the side (right side of the paper plane in FIG. 2) opposite the side on which the mixture supply portion 51 is provided, relative to the partition 54, in the width direction (left-right direction) of the paper plane in FIG. 2. In this manner, the first separated objects 200 mainly containing the magnetic bodies 101 and partially containing the non-magnetic bodies 102 fall to the conveyed falling area Q.

In addition, of the mixture 100 that has been supplied to the rotating drum 52, most of the non-magnetic bodies 102 naturally fall directly into a naturally falling area P below by the action of gravity without being magnetically attracted to the rotating drum 52. The naturally falling area P is located on the side on which the mixture supply portion 51 is provided, relative to the partition 54, in the width direction (left-right direction) of the paper plane in FIG. 2. At this time, some of the magnetic bodies 101 that were magnetically attracted to the rotating drum 52 naturally fall due to, for example, collision with many naturally falling non-magnetic bodies 102 or release from the magnetic force of the magnet 53 after reaching a part where the magnetic force is weak during rotation of the rotating drum 52. For this reason, second separated objects 300 mainly containing the non-magnetic bodies 102 and partially containing the magnetic bodies 101 fall into the naturally falling area P.

In this manner, the magnetic force separating mechanism 5 separates the mixture 100 into the first separated objects 200 and the second separated objects 300 by attracting the magnetic bodies 101 by means of magnetic force.

The first separated object supply portion 55 is disposed on the side (right side of the paper plane in FIG. 2) opposite the side on which the mixture supply portion 51 is provided, relative to the partition 54, in the width direction (left-right direction) of the paper plane in FIG. 2. The first separated object supply portion 55 is disposed below the conveyed falling area Q. The first separated object supply portion 55 supplies the first separated objects 200 that have fallen into the conveyed falling area Q to a first wind force separating portion 70 described below. The first separated object supply portion 55 is disposed below a first chute 55s. The first chute 55s is formed so as to taper downward. The first chute 55s collects and guides the first separated objects 200 that have fallen into the conveyed falling area Q downward toward the first separated object supply portion 55.

The first separated object supply portion 55 comprises a first flow rate adjustment mechanism 58 at the bottom end thereof. The first flow rate adjustment mechanism 58 is plate-like and is disposed above a bottom plate 55p disposed at the lower end of the first separated object supply portion 55. The first flow rate adjustment mechanism 58 is configured to be swingable about a rotation axis extending in a direction orthogonal to the paper plane in FIG. 2. The first flow rate adjustment mechanism 58 is configured such that the size of a gap between the lower end of the first flow rate adjustment mechanism 58 and the bottom plate 55p can be adjusted by modifying the swing angle by means of an adjustment screw (not shown) and the like. By adjusting the size of the gap, the first flow rate adjustment mechanism 58 adjusts the amount (flow rate) of the first separated objects 200 that are supplied to the first wind force separating portion 70.

The second separated object supply portion 56 is disposed on the side (left side of the paper plane in FIG. 2) on which the mixture supply portion 51 is provided, relative to the partition 54, in the width direction (left-right direction) of the paper plane in FIG. 2. The second separated object supply portion 56 is disposed below the naturally falling area P. The second separated object supply portion 56 supplies the second separated objects 300 that have fallen into the naturally falling area P to a second wind force separating portion 80 described below. The second separated object supply portion 56 is disposed below a second chute 56s. The second chute 56s is formed so as to taper downward. The second chute 56s collects and guides the second separated objects 300 that have fallen into the naturally falling area P downward toward the second separated object supply portion 56.

The second separated object supply portion 56 has an opening 56o that opens from the magnetic force separating mechanism 5 toward the downstream side in the flow direction of the wind W. The second separated objects 300 are supplied from the magnetic force separating mechanism 5 through the opening 56o to the second wind force separating portion 80.

The second separated object supply portion 56 comprises a second flow rate adjustment mechanism 59 at the bottom end thereof. The second flow rate adjustment mechanism 59 is plate-like and is disposed above a bottom plate 56p disposed at the bottom end of the second separated object supply portion 56. The second flow rate adjustment mechanism 59 is configured to be swingable about a rotation axis extending in a direction orthogonal to the paper plane in FIG. 2. The second flow rate adjustment mechanism 59 is configured such that the size of a gap between the bottom end of the second flow rate adjustment mechanism 59 and the bottom plate 56p can be adjusted by modifying the swing angle by means of an adjustment screw (not shown) and the like. By adjusting the size of the gap, the second flow rate adjustment mechanism 59 adjusts the amount (flow rate) of the second separated objects 300 that are supplied to the second wind force separating portion 80.

The wind force separating mechanism 6 is disposed inside a second separating chamber 42 formed at the lower portion of the separation device 4. The wind force separating mechanism 6 comprises a wind force generation portion 61, the first wind force separating portion 70, and the second wind force separating portion 80.

The wind force generation portion 61 generates wind W inside the second separating chamber 42. This wind W generates wind force for performing separating processing of the first separated objects 200 and the second separated objects 300. The wind force generation portion 61 comprises a suction duct (suction portion) 62. The suction duct 62 is connected to, for example, a dust collector (not shown). An air inlet 63 is formed on the side opposite the side where the suction duct 62 is provided in the second separating chamber 42. The wind force generation portion 61 sucks in air inside the second separating chamber 42 through the suction duct 62 by means of negative pressure generated by a fan in the dust collector. Then, air outside the second separating chamber 42 is drawn in through the air inlet 63. Thus, the wind force generation portion 61 generates wind W that flows from the air inlet 63 to the suction duct 62 inside the second separating chamber 42. The suction duct 62 is disposed downstream of and above the first wind force separating portion 70 and the second wind force separating portion 80 in the flow direction of the wind W.

The first wind force separating portion 70 separates the first separated objects 200 into the magnetic bodies 101 and the non-magnetic bodies 102 by means of the wind force of the wind W. The second wind force separating portion 80 separates the second separated objects 300 into the non-magnetic bodies 102 and the magnetic bodies 101 by means of the wind force. The first wind force separating portion 70 and the second wind force separating portion 80 are disposed next to each other along a flow path of the wind W that is generated by the wind force generation portion 61. The first wind force separating portion 70 is disposed upstream in the flow direction of the wind W relative to the second wind force separating portion 80.

The first wind force separating portion 70 comprises a first magnetic body recovery portion 71, a small-diameter magnetic body recovery portion 72, a first non-magnetic body recovery portion 73, and a partition plate 77.

The first magnetic body recovery portion 71 is disposed below the first separated object supply portion 55 to which the first separated objects 200 are supplied from the magnetic force separating mechanism 5. The first magnetic body recovery portion 71 opens upward. The first magnetic body recovery portion 71 recovers the magnetic bodies 101 contained in the first separated objects 200. The upper end of a first hose 91 is connected to the lower portion of the first magnetic body recovery portion 71. The lower end of the first hose 91 is connected to the projector 22 of the blast-processing device 2.

A first divider 74 is formed downstream in the flow direction of the wind W relative to the first magnetic body recovery portion 71. The first divider 74 extends from the lower portion of the second separating chamber 42 upward. The first divider 74 sections off the first magnetic body recovery portion 71 from the small-diameter magnetic body recovery portion 72. An inlet portion 75 for the wind W is formed between the first divider 74 and the bottom plate 55p of the first separated object supply portion 55. The wind W flows through the inlet portion 75 from the first magnetic body recovery portion 71 side to the small-diameter magnetic body recovery portion 72 side.

The small-diameter magnetic body recovery portion 72 is disposed downstream in the flow direction of the wind W relative to the first magnetic body recovery portion 71. A second divider 76 is formed downstream in the flow direction of the wind W relative to the small-diameter magnetic body recovery portion 72. The second divider 76 extends from the lower portion of the second separating chamber 42 upward. The second divider 76 sections off the small-diameter magnetic body recovery portion 72 from the first non-magnetic body recovery portion 73. The small-diameter magnetic body recovery portion 72 opens upward between the first divider 74 and the second divider 76. The upper end of a second hose 92 is connected to the lower portion of the small-diameter magnetic body recovery portion 72. The lower end of the second hose 92 is connected to a recovery portion (not shown) that recovers small-diameter magnetic bodies 101s described in more detail below.

The first non-magnetic body recovery portion 73 is disposed downstream in the flow direction of the wind W relative to the first magnetic body recovery portion 71 and the small-diameter magnetic body recovery portion 72. The partition plate 77 is provided downstream in the flow direction of the wind W relative to the first non-magnetic body recovery portion 73. The partition plate 77 extends from the lower portion of the second separating chamber 42 upward. The first non-magnetic body recovery portion 73 opens upward between the second divider 76 and the partition plate 77. The first non-magnetic body recovery portion 73 recovers the non-magnetic bodies 102 contained in the first separated objects 200.

The upper end of a third hose 93 is connected to the lower portion of the first non-magnetic body recovery portion 73. The lower end of the third hose 93 is connected to a non-magnetic body recovery portion (not shown) that recovers the non-magnetic bodies 102.

The partition plate 77 is formed so as to protrude further upward than the first divider 74 and the second divider 76. The partition plate 77 extends so as to protrude further upward, in the up-down direction, than the bottom plate 55p forming an upper end 75t of the inlet portion 75.

The second wind force separating portion 80 is disposed downstream in the flow direction of the wind W relative to the partition plate 77. The second wind force separating portion 80 comprises a second magnetic body recovery portion 81 and a second non-magnetic body recovery portion 82.

The second magnetic body recovery portion 81 is disposed downstream in the flow direction of the wind W relative to the partition plate 77. A third divider 83 is formed downstream in the flow direction of the wind W relative to the second magnetic body recovery portion 81. The third divider 83 extends from the lower portion of the second separating chamber 42 upward. The third divider 83 sections off the second magnetic body recovery portion 81 from the second non-magnetic body recovery portion 82. The third divider 83 is formed to be at almost the same height as that of the partition plate 77. The second magnetic body recovery portion 81 opens upward between the partition plate 77 and the third divider 83. The second magnetic body recovery portion 81 is disposed almost vertically below the second separated object supply portion 56 to which the second separated objects 300 are supplied from the magnetic force separating mechanism 5. The second magnetic body recovery portion 81 recovers the magnetic bodies 101 contained in the second separated objects 300.

The upper end of a fourth hose 94 is connected to the lower portion of the second magnetic body recovery portion 81. The lower end of the fourth hose 94 is connected to the projection chamber 21 of the blast-processing device 2.

The second non-magnetic body recovery portion 82 is disposed downstream in the flow direction of the wind W relative to the second magnetic body recovery portion 81. The second non-magnetic body recovery portion 82 opens upward downstream in the flow direction of the wind W relative to the third divider 83. The second non-magnetic body recovery portion 82 recovers the non-magnetic bodies 102 contained in the second separated objects 300.

The upper end of a fifth hose 95 is connected to the lower portion of the second non-magnetic body recovery portion 82. The lower end of the fifth hose 95 is connected to a non-magnetic body recovery portion (not shown) that recovers the non-magnetic bodies 102.

In such a configuration, the first separated objects 200 naturally fall from the first separated object supply portion 55. The wind W hits the naturally falling first separated objects 200. Then, of the magnetic bodies 101 and the non-magnetic bodies 102 contained in the first separated objects 200, the non-magnetic bodies 102 that are lighter than the magnetic bodies 101 are blown away downstream in the flow direction by the wind W. In addition, the first separated objects 200 contain magnetic bodies 101 whose initial particle diameter and mass were reduced due to wear and fracture and the like during blast-processing (hereinafter referred to as small-diameter magnetic bodies 101s). The small-diameter magnetic bodies 101s contained in the first separated objects 200 are also blown away by the wind W. Thus, only the magnetic bodies 101 having a reusable particle diameter naturally fall into the first magnetic body recovery portion 71 and are recovered. In other words, the wind speed of the wind W is set so as to make the magnetic bodies 101 having a particle diameter and mass reusable for blast-processing naturally fall into the first magnetic body recovery portion 71 and blow away the small-diameter magnetic bodies 101s whose particle diameter and mass were reduced to a certain level or lower.

The magnetic bodies 101 that were recovered by the first magnetic body recovery portion 71 are supplied through the first hose 91 to the projector 22 and reused for blast-processing.

The wind W that has blown away the small-diameter magnetic bodies 101s and the non-magnetic bodies 102 from the first separated objects 200 flows from the first magnetic body recovery portion 71 side through the inlet portion 75 to the small-diameter magnetic body recovery portion 72 side. The wind W flows obliquely upward toward the suction duct 62 downstream in the flow direction relative to the inlet portion 75. In the flow path of the wind W, the cross-sectional area of the flow path is smallest at this part of the inlet portion 75. The cross-sectional area of the flow path of the wind W gradually increases downstream from the inlet portion 75. For this reason, the wind speed of the wind W is greatest at the inlet portion 75 part. The wind speed of the wind W gradually decreases after passing through the inlet portion 75.

Of the small-diameter magnetic bodies 101s and the non-magnetic bodies 102, the small-diameter magnetic bodies 101s having more mass than the non-magnetic bodies 102 are blown away a shorter distance by the wind W than the non-magnetic bodies 102. The small-diameter magnetic bodies 101s that have deviated downward from the flow path of the wind W due to their own weight naturally fall while moving downstream in the flow direction of the wind W due to inertia. Consequently, the small-diameter magnetic bodies 101s fall into the small-diameter magnetic body recovery portion 72 between the first magnetic body recovery portion 71 and the first non-magnetic body recovery portion 73 and are recovered. The small-diameter magnetic bodies 101s that were recovered by the small-diameter magnetic body recovery portion 72 are discharged through the second hose 92 and discarded separately from the non-magnetic bodies 102.

Of the small-diameter magnetic bodies 101s and the non-magnetic bodies 102, the non-magnetic bodies 102 having less mass than the small-diameter magnetic bodies 101s are blown a longer distance by the wind W than the small-diameter magnetic bodies 101s. Thus, the non-magnetic bodies 102 move past the small-diameter magnetic body recovery portion 72. Thereafter, the non-magnetic bodies 102 that have deviated downward from the flow path of the wind W due to their own weight fall naturally while moving downstream in the flow direction of the wind W due to inertia. The non-magnetic bodies 102 that have naturally fallen fall into the first non-magnetic body recovery portion 73 and are recovered. In addition, due to inertia, the non-magnetic bodies 102 that have passed through the opening at the upper portion of the first non-magnetic body recovery portion 73 collide with the partition plate 77. The non-magnetic bodies 102 that have collided with the partition plate 77 lose their inertia and naturally fall into the first non-magnetic body recovery portion 73 below. The non-magnetic bodies 102 that were recovered by the first non-magnetic body recovery portion 73 in this manner are discharged through the third hose 93 and discarded.

The wind W that has separated the magnetic bodies 101, the small-diameter magnetic bodies 101s, and the non-magnetic bodies 102 contained in the first separated objects 200 in the first wind force separating portion 70 in the manner described above flows past the partition plate 77 to the second wind force separating portion 80 further downstream in the flow direction.

In the second wind force separating portion 80, the wind W hits the second separated objects 300 naturally falling from the second separated object supply portion 56 provided above. Here, the second separated object supply portion 56 is spaced apart by a gap S defined, in the up-down direction, above an imaginary line K linking the upper end 75t of the inlet portion 75 and the upper portion of the suction duct 62. This defined gap S is set, for example, as follows. The time for the magnetic bodies 101 that were supplied from the second separated object supply portion 56 to freely fall a distance corresponding to the maximum particle diameter of the magnetic bodies 101 is defined as a reference time. Here, the maximum particle diameter of the magnetic bodies 101 means the particle diameter in an initial state in which the magnetic bodies 101 are not worn. As the magnetic bodies 101 and the non-magnetic bodies 102 that were supplied from the second separated object supply portion 56 fall, the falling speed thereof increases due to gravitational acceleration. Here, the distance when the magnetic bodies 101 start to naturally fall and accelerate and the gap between the magnetic bodies 101 that are continuously falling at intervals of the reference time becomes ten times the distance corresponding to the maximum particle diameter is set as the defined gap S. In other words, by setting the gap S in this manner, the second separated objects 300 (the magnetic bodies 101 and the non-magnetic bodies 102) that were supplied from the second separated object supply portion 56 accelerate while falling and scatter in the up-down direction. The second separated objects 300, whose density has decreased after scattering in the up-down direction, are made to hit the wind W below the imaginary line K. This suppresses the wind speed of the wind W from drastically decreasing by hitting the second separated objects 300.

In the second wind force separating portion 80, when the wind W hits the second separated objects 300 that are supplied from the second separated object supply portion 56, the non-magnetic bodies 102 mainly contained in the second separated objects 300 are blown away downstream in the flow direction of the wind W. Thus, the magnetic bodies 101 contained in the second separated objects 300 fall into the second magnetic body recovery portion 81 below and are recovered. The magnetic bodies 101 that were recovered are supplied through the fourth hose 94 to the projection chamber 21 and reused for blast-processing.

The non-magnetic bodies 102 that were blown away by the wind W fall into the second non-magnetic body recovery portion 82 located downstream of the second magnetic body recovery portion 81 in the flow direction of the wind W and are recovered. The non-magnetic bodies 102 that were recovered by the second non-magnetic body recovery portion 82 are discharged through the fifth hose 95 to the outside of the separation device 4.

According to the configuration as mentioned above, the separation device 4 separates a mixture of magnetic bodies 101 that are granular and non-magnetic bodies 102 that are granular into the magnetic bodies 101 and the non-magnetic bodies 102. The separation device 4 comprises a magnetic force separating mechanism 5, a wind force generation portion 61, a first wind force separating portion 70, and a second wind force separating portion 80. The magnetic force separating mechanism 5 separates a mixture 100 into first separated objects 200 and second separated objects 300 by attracting the magnetic bodies 101 from the mixture 100 by means of magnetic force. The first separated objects 200 mainly contain the magnetic bodies 101 and also contain the non-magnetic bodies 102. The second separated objects 300 mainly contain the non-magnetic bodies 102 and also contain the magnetic bodies 101. The wind force generation portion 61 generates wind force. The first wind force separating portion 70 separates the first separated objects 200 into the magnetic bodies 101 and the non-magnetic bodies 102 by means of wind force. The second wind force separating portion 80 separates the second separated objects 300 into the non-magnetic bodies 102 and the magnetic bodies 101 by means of the wind force. The first wind force separating portion 70 and the second wind force separating portion 80 are disposed next to each other along a flow path of wind W that is generated by the wind force generation portion 61.

According to such a configuration, the first separated objects 200, which mainly contain the magnetic bodies 101 and are separated by the magnetic force separating mechanism 5, are separated into the magnetic bodies 101 and the non-magnetic bodies 102 by the first wind force separating portion 70. The second separated objects 300, which mainly contain the non-magnetic bodies 102 and are separated by the magnetic force separating mechanism 5, are separated into the non-magnetic bodies 102 and the magnetic bodies 101 by the second wind force separating portion 80. In this manner, in addition to the separating of the first separated objects 200 that mainly contain the magnetic bodies 101 by means of wind force, the second separated objects 300 that mainly contain the non-magnetic bodies 102 are separated by means of wind force. Thus, the magnetic bodies 101 and the non-magnetic bodies 102 can be separated more reliably. In particular, the magnetic bodies 101 can be separated and recovered from the second separated objects 300 that mainly contain the non-magnetic bodies 102 and were separated by the magnetic force separating mechanism 5. In this regard, it is possible to suppress the consumed amount of magnetic bodies 101 and also suppress the discarded amount of non-magnetic bodies 102 including the magnetic bodies 101. In addition, because the first wind force separating portion 70 and the second wind force separating portion 80 use wind force generated by the wind force generation portion 61, the equipment costs, running costs, energy costs, and the like can be suppressed in comparison with providing the magnetic force separating mechanism 5 at a plurality of stages.

In addition, because the wind W that was generated by means of the wind force generation portion 61 flows sequentially to the first wind force separating portion 70 and the second wind force separating portion 80, it is possible to efficiently perform separating with a simple configuration compared to when sending the wind W that was generated by the wind force generation portion 61 individually to each of the first wind force separating portion 70 and the second wind force separating portion 80. Therefore, in such a configuration, it is possible to more reliably separate magnetic bodies and non-magnetic bodies while suppressing an increase in costs.

In addition, the first wind force separating portion 70 is disposed upstream in the flow direction of the wind W relative to the second wind force separating portion 80. According to such a configuration, the separation device 4 can be appropriately realized.

In addition, the non-magnetic bodies 102 have less mass than the magnetic bodies 101 and the first wind force separating portion 70 comprises a first magnetic body recovery portion 71, a first non-magnetic body recovery portion 73, and a partition plate 77. The first magnetic body recovery portion 71 is disposed below the first separated object supply portion 55 to which the first separated objects 200 are supplied from the magnetic force separating mechanism 5. The first magnetic body recovery portion 71 recovers the magnetic bodies 101 contained in the first separated objects 200. The first non-magnetic body recovery portion 73 is disposed downstream in the flow direction of the wind W relative to the first magnetic body recovery portion 71. The first non-magnetic body recovery portion 73 recovers the non-magnetic bodies 102 contained in the first separated objects 200. The partition plate 77 is disposed downstream in the flow direction of the wind W relative to the first non-magnetic body recovery portion 73. The partition plate 77 partitions the first wind force separating portion 70 from the second wind force separating portion 80.

According to such a configuration, the first magnetic body recovery portion 71 is disposed upstream of the first non-magnetic body recovery portion 73 in the flow direction of the wind W. In the first wind force separating portion 70, when the wind W hits the first separated objects 200 that were supplied from the first separated object supply portion 55, the non-magnetic bodies 102 that have less mass than the magnetic bodies 101 are blown away by the wind W. Thus, the magnetic bodies 101 that have more mass than the non-magnetic bodies 102 fall into the first magnetic body recovery portion 71 located upstream in the flow direction of the wind W and are recovered. The non-magnetic bodies 102 that were blown away by the wind W fall into the first non-magnetic body recovery portion 73 located downstream of the first magnetic body recovery portion 71 in the flow direction of the wind W and are recovered. In addition, the partition plate 77 is provided downstream in the flow direction of the wind W relative to the first non-magnetic body recovery portion 73. Even if the non-magnetic bodies 102 that were blown away by the wind W attempt to flow past the first non-magnetic body recovery portion 73, the non-magnetic bodies 102 fall into the first non-magnetic body recovery portion 73 by colliding with the partition plate 77 and are recovered. In this manner, in the first wind force separating portion 70, the magnetic bodies 101 and the non-magnetic bodies 102 can be separated efficiently by means of wind force.

In addition, the first wind force separating portion 70 further comprises a small-diameter magnetic body recovery portion 72 between the first magnetic body recovery portion 71 and the first non-magnetic body recovery portion 73. The small-diameter magnetic body recovery portion 72 recovers magnetic bodies 101 (small-diameter magnetic bodies 101s) that have a smaller particle diameter than the magnetic bodies 101 recovered by the first magnetic body recovery portion 71 and that have more mass than the non-magnetic bodies 102 recovered by the first non-magnetic body recovery portion 73.

According to such a configuration, the first separated objects 200 that are supplied from the first separated object supply portion 55 may contain small-diameter magnetic bodies 101s with a reduced diameter due to wear and fracture and the like. The small-diameter magnetic bodies 101s have less mass than the magnetic bodies 101 that are recovered by the first magnetic body recovery portion 71. In the first wind force separating portion 70, such small-diameter magnetic bodies 101s are blown away along with the non-magnetic bodies 102 by the wind W and are not recovered by the first magnetic body recovery portion 71. Because the small-diameter magnetic bodies 101s that were blown away have more mass than the non-magnetic bodies 102 that are recovered by the first non-magnetic body recovery portion 73, these small-diameter magnetic bodies 101s are blown away a shorter distance by the wind W than the non-magnetic bodies 102. Consequently, the small-diameter magnetic bodies 101s fall into the small-diameter magnetic body recovery portion 72 between the first magnetic body recovery portion 71 and the first non-magnetic body recovery portion 73 and are recovered. In this manner, it is possible to separate the small-diameter magnetic bodies 101s contained in the first separated objects 200 separately from the magnetic bodies 101 that are recovered by the first magnetic body recovery portion 71 and the non-magnetic bodies 102 that are recovered by the first non-magnetic body recovery portion 73. Thus, it is possible to reduce the amount of magnetic bodies 101 contained in the non-magnetic bodies 102 that are recovered by the first non-magnetic body recovery portion 73. Consequently, it is possible to suppress the amount of non-magnetic bodies 102, including the magnetic bodies 101, that are discarded.

In addition, the partition plate 77 extends so as to protrude further upward, in the up-down direction, than the upper end 75t of the inlet portion 75 through which the wind W flows from the first magnetic body recovery portion 71 side to the first non-magnetic body recovery portion 73 side.

This makes it possible to suppress the non-magnetic bodies 102 that were blown away from the first separated objects 200 by the wind W from moving past the partition plate 77 and entering the second wind force separating portion 80, and then mixing with the magnetic bodies 101 that are separated by the second wind force separating portion 80.

In addition, a suction duct (suction portion) 62 sucks in air for generating wind force in the wind force generation portion 61. The suction duct 62 is disposed downstream of and above the first wind force separating portion 70 and the second wind force separating portion 80 in the flow direction of the wind W.

According to such a configuration, the wind W that is generated by air being sucked in by the suction duct 62 flows obliquely upward, downstream in the flow direction of the wind W, from the first wind force separating portion 70 to the second wind force separating portion 80. That is, in the above-mentioned configuration, the second wind force separating portion 80 is located above the first wind force separating portion 70. For this reason, in the first wind force separating portion 70, the non-magnetic bodies 102 having low mass are unlikely to reach the next-stage second wind force separating portion 80 located at a higher position, even if the non-magnetic bodies 102 are separated and blown away by the wind W. For this reason, the non-magnetic bodies 102 that are to be recovered by the first non-magnetic body recovery portion 73 are inhibited from reaching the second wind force separating portion 80 and mixing with the magnetic bodies 101 that are separated by the second wind force separating portion 80.

In addition, the second wind force separating portion 80 comprises a second magnetic body recovery portion 81 and a second non-magnetic body recovery portion 82. The second magnetic body recovery portion 81 is disposed below the second separated object supply portion 56 to which the second separated objects 300 are supplied from the magnetic force separating mechanism 5. Furthermore, the second magnetic body recovery portion 81 is disposed downstream in the flow direction of the wind W relative to the partition plate 77. The second magnetic body recovery portion 81 recovers the magnetic bodies 101 contained in the second separated objects 300. The second non-magnetic body recovery portion 82 is disposed downstream in the flow direction of the wind W relative to the second magnetic body recovery portion 81. The second non-magnetic body recovery portion 82 recovers the non-magnetic bodies 102 contained in the second separated objects 300.

According to such a configuration, in the second wind force separating portion 80, the second separated objects 300 that were supplied from the magnetic force separating mechanism 5 fall from the second separated object supply portion 56. The wind W that has flowed past the partition plate 77 hits the second separated objects 300 that have fallen. When the wind W hits the second separated objects 300, the non-magnetic bodies 102 that have less mass than the magnetic bodies 101 are blown away downstream in the flow direction by the wind W. The non-magnetic bodies 102 that were blown away by the wind W fall into the second non-magnetic body recovery portion 82 located downstream of the second magnetic body recovery portion 81 in the flow direction of the wind W and are recovered. The magnetic bodies 101 that have more mass than the non-magnetic bodies 102 fall into the second magnetic body recovery portion 81 disposed below the second separated object supply portion 56 and are recovered. In this manner, in the second wind force separating portion 80, the magnetic bodies 101 and the non-magnetic bodies 102 can be separated efficiently by means of wind force.

In addition, the second separated object supply portion 56 is disposed spaced apart by a gap S defined, in the up-down direction, above an imaginary line K linking an upper end 75t of an inlet portion 75, through which the wind W flows from the first magnetic body recovery portion 71 side to the first non-magnetic body recovery portion 73 side, and the upper portion of the suction duct 62.

In such a configuration, the second separated objects 300 that are supplied to the second wind force separating portion 80 freely fall from the second separated object supply portion 56. The magnetic bodies 101 and the non-magnetic bodies 102 constituting the second separated objects 300 that freely fall from the second separated object supply portion 56 accelerate as the size of the fall from the second separated object supply portion 56 increases due to gravitational acceleration. Then, immediately after starting to fall from the second separated object supply portion 56, even if many magnetic bodies 101 and non-magnetic bodies 102 are gathered in high density, many of these magnetic bodies 101 and non-magnetic bodies 102 will scatter in the up-down direction and the density thereof will decrease as the size of the fall increases. When the magnetic bodies 101 and the non-magnetic bodies 102 are hit with the wind W in an area where they have scattered in the up-down direction and the density thereof has decreased in this manner, this inhibits the wind speed from being weakened by the magnetic bodies 101 and the non-magnetic bodies 102 because the number of magnetic bodies 101 and non-magnetic bodies 102 in the flow path of the wind W is lower compared to when the magnetic bodies 101 and the non-magnetic bodies 102 are hit with the wind W in a high-density area. Therefore, variations in the wind speed are inhibited and the influence of these variations on the separating of the magnetic bodies 101 and the non-magnetic bodies 102 is reduced.

In addition, the defined gap S is set so as to be greater than or equal to the distance when a gap between the magnetic bodies 101 that are continuously falling at intervals of a reference time becomes ten times the distance corresponding to the maximum particle diameter of the magnetic bodies 101, the reference time being defined as the time for the magnetic bodies 101 to freely fall a distance corresponding to the maximum particle diameter.

According to such a configuration, the second separated objects 300 can be hit with the wind W in an area where the density of the magnetic bodies 101 and the non-magnetic bodies 102 has become sufficiently low after falling from the second separated object supply portion 56. Therefore, the separating of the magnetic bodies 101 and the non-magnetic bodies 102 in the second wind force separating portion 80 can be performed more efficiently.

In addition, the cross-sectional area of the flow path of the wind W gradually increases downstream from the first wind force separating portion 70 in the flow direction of the wind W.

According to such a configuration, the wind speed of the wind W in the first wind force separating portion 70 can be set higher than that in the second wind force separating portion 80. The first separated objects 200 that are separated by the first wind force separating portion 70 mainly contain magnetic bodies 101. By hitting such first separated objects 200 with the wind W at a high wind speed, the non-magnetic bodies 102 that are mixed together with the magnetic bodies 101, for example by being adhered to the surface of the magnetic bodies 101, can be blown away by pulling away the non-magnetic bodies 102 from the magnetic bodies 101. In this manner, the separating of the magnetic bodies 101 and the non-magnetic bodies 102 by means of wind force in the first wind force separating portion 70 can be performed efficiently.

Furthermore, by setting the wind speed of the wind W in the first wind force separating portion 70 so as to be high, the small-diameter magnetic bodies 101s having more mass than the non-magnetic bodies 102 can also be separated.

In addition, in the second wind force separating portion 80, the second separated objects 300 are hit with wind W at a low wind speed. Therefore, the non-magnetic bodies 102 can be pulled away from the magnetic bodies 101 contained in the second separated objects 300 while suppressing the non-magnetic bodies 102 from dispersing into the surrounding areas. In this manner, the separating of the magnetic bodies 101 and the non-magnetic bodies 102 by means of wind force in the second wind force separating portion 80 can be performed efficiently.

In addition, the magnetic bodies 101 are blasting abrasives that are projected at the workpiece 10 and the non-magnetic bodies 102 are molding sand.

According to such a configuration, it is possible to appropriately separate blasting abrasives 101 and molding sand, particularly in relation to the mixture 100 that is discharged from blast-processing.

In addition, in the present embodiment, the magnetic bodies 101 and the non-magnetic bodies 102 are not moved vertically upward. As such, less energy is required.

The separation device of the present invention is not to be construed as being limited to the embodiment mentioned above that was described with reference to drawings, and various other modifications may be contemplated within the technical scope thereof.

First Modification

Figure 3:
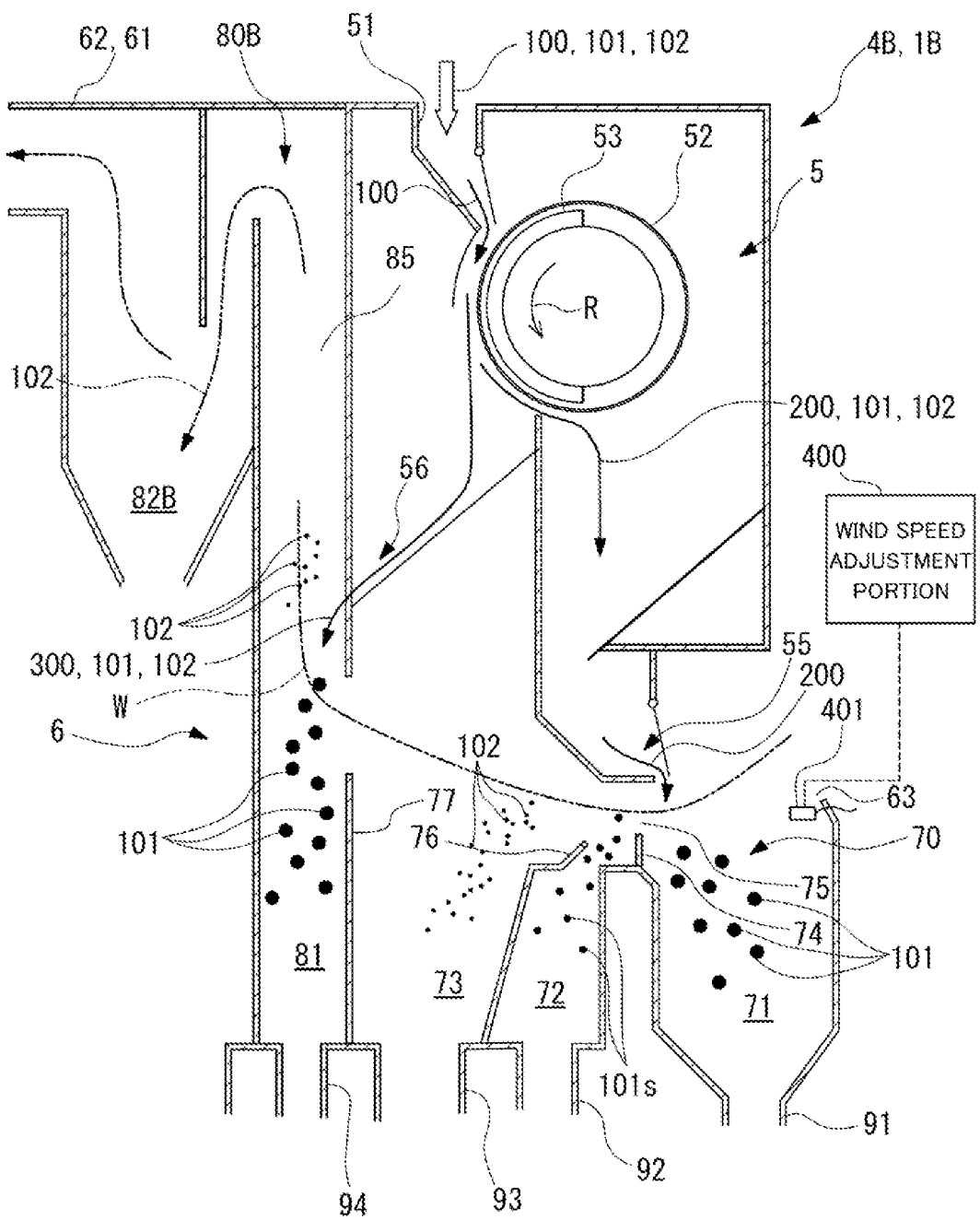
FIG. 3 is a cross-sectional view illustrating the overall configuration of a separation device according to a first modification of the present embodiment.

For example, as illustrated in FIG. 3, in a second wind force separating portion 80B that separates the second separated objects 300 in a separation device 4B of blast-processing equipment 1B, the wind W may be configured to hit the second separated objects 300, which are supplied from the second separated object supply portion 56, vertically upward from below.

The second wind force separating portion 80B has a flow path 85 extending upward above the second magnetic body recovery portion 81. The second separated object supply portion 56 is disposed so as to supply the second separated objects 300 into the flow path 85.

A second non-magnetic body recovery portion 82B is disposed adjacent to the flow path 85. The second non-magnetic body recovery portion 82B is in communication with the flow path 85 at the upper end of the flow path 85.

In a second wind force separating portion 80B with such a configuration, the wind W that has flowed past the partition plate 77 into the second wind force separating portion 80B is drawn into the flow path 85 by means of suction force from the suction duct 62. The second separated objects 300 that are supplied from the second separated object supply portion 56 hit the wind W flowing from below while naturally falling in the flow path 85. Then, of the second separated objects 300, the magnetic bodies 101 having high mass naturally fall against the wind W and are recovered by the second magnetic body recovery portion 81 below. Of the second separated objects 300, the non-magnetic bodies 102 having low mass are carried upward by the wind W, flow into the second non-magnetic body recovery portion 82B, and are recovered.

In such a configuration, there is a need to carry the non-magnetic bodies 102 upward by means of the wind W in the flow path 85. For this reason, there is a need to set the wind speed of the wind W higher than that in the above-mentioned embodiment.

Figure 4:
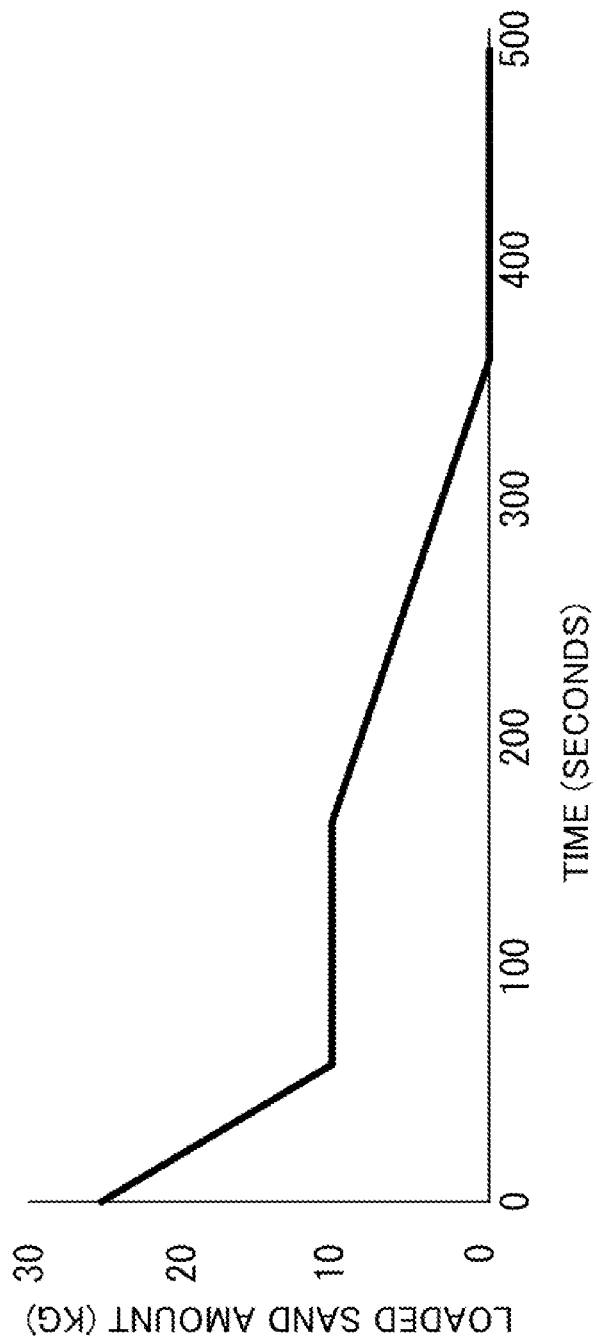
FIG. 4 is a drawing illustrating an example of a variation pattern in which the amount of non-magnetic bodies (sand) contained in a mixture varies over time.

For example, when removing, by blast-processing, molding sand constituting a sand mold covering the workpiece 10 that is a cast article that was formed by means of sand casting, a large amount of molding sand is discharged from the blast-processing device 2 at the early stage of blast-processing, as illustrated in FIG. 4. Thereafter, as the removal of molding sand constituting the sand mold progresses over time, the discharged amount of molding sand decreases. After the molding sand covering the cast article has largely been removed, almost no molding sand is discharged at the stage during which the cast article surface is being subjected to blast-processing. Along with this, the amount of non-magnetic bodies 102 (sand) contained in the mixture 100 that is loaded into the separation device 4B, as well as the ratio of magnetic bodies 101 to non-magnetic bodies 102 contained in the mixture 100 that is supplied to the separation device 4B, change over time. When the amount of the mixture 100 and the ratio of magnetic bodies 101 to non-magnetic bodies 102 change, the amount of first separated objects 200 and second separated objects 300 as well as the amount of magnetic bodies 101 and non-magnetic bodies 102 that are supplied per unit time to the first wind force separating portion 70 and the second wind force separating portion 80B change.

Here, in the first wind force separating portion 70 and the second wind force separating portion 80B, when the wind W hits the first separated objects 200 and the second separated objects 300, the wind speed thereof decreases. For this reason, if the amount of first separated objects 200 and second separated objects 300 as well as the amount of magnetic bodies 101 and non-magnetic bodies 102 that are supplied per unit time change, this means the degree to which the wind speed decreases in the first wind force separating portion 70 and the second wind force separating portion 80B also changes. Accordingly, the state of the separating of magnetic bodies 101 and non-magnetic bodies 102 in the first wind force separating portion 70 and the second wind force separating portion 80B could change over time. That is, when the wind speed greatly decreases, for example in the first wind force separating portion 70, this increases the possibility that the small-diameter magnetic bodies 101s and the non-magnetic bodies 102 that are to be separated from the magnetic bodies 101 will become mixed together with the magnetic bodies 101 without being sufficiently separated and be discharged from the first magnetic body recovery portion 71. When the wind speed of the wind W is high, as in the present modification, the degree to which the wind speed changes also becomes great and the influence on the state of the separating could also become stronger.

Accordingly, as illustrated in FIG. 3, the separation device 4B may be configured to comprise a wind speed adjustment portion 400. The wind speed adjustment portion 400 adjusts the wind speed of the wind W that is generated by the wind force generation portion 61 on the basis of the wind speed of the wind W in the first wind force separating portion 70 or the second wind force separating portion 80B.

For example, in this modification, the wind speed adjustment portion 400 comprises a wind speed detection portion 401 that detects the wind speed of the wind W. It is desirable that the wind speed detection portion 401 is, for example, disposed on the air inlet 63 side of the first wind force separating portion 70, which is the part located most upstream of the wind W, so as to not be damaged from contact with the first separated objects 200 and the second separated objects 300, to detect the wind speed in the first wind force separating portion 70. Of course, the wind speed detection portion 401 can be provided at another location and may also be provided so as to detect the wind speed in the second wind force separating portion 80B. The wind speed adjustment portion 400 adjusts the wind speed of the wind W that is generated by the wind force generation portion 61 on the basis of the wind speed of the wind W that was detected by the wind speed detection portion 401. Specifically, the wind speed adjustment portion 400 adjusts the opening of a damper provided to the suction duct 62 and the like.

In this manner, the separation device 4B of the present first modification further comprises a wind speed adjustment portion 400 that adjusts the wind speed of the wind W that is generated by the wind force generation portion 61 on the basis of the wind speed of the wind W in the first wind force separating portion 70 or the second wind force separating portion 80B.

According to such a configuration, the wind speed in areas where the first separated objects 200 and the second separated objects 300 are separated can be adjusted by the wind speed adjustment portion 400. Depending on the type of mixture 100, the amount of the mixture 100 and the ratio of magnetic bodies 101 to non-magnetic bodies 102 contained in the mixture 100 may change over time after the mixture 100 is loaded into the separation device 4B and separating is initiated. In such a case, when the amount of the mixture 100 and the ratio of magnetic bodies 101 to non-magnetic bodies 102 change, the amount of first separated objects 200 and second separated objects 300 as well as the amount of magnetic bodies 101 and non-magnetic bodies 102 that are supplied per unit time to the first wind force separating portion 70 and the second wind force separating portion 80 change. In the first wind force separating portion 70 and the second wind force separating portion 80, when the wind W hits the first separated objects 200 and the second separated objects 300, the wind speed thereof decreases. For this reason, if the amount of first separated objects 200 and second separated objects 300 as well as the amount of magnetic bodies 101 and non-magnetic bodies 102 that are supplied per unit time change, this means the degree to which the wind speed decreases in the first wind force separating portion 70 and the second wind force separating portion 80 also changes. Accordingly, the state of the separating of magnetic bodies 101 and non-magnetic bodies 102 in the first wind force separating portion 70 and the second wind force separating portion 80 could change over time. In contrast, by adjusting the wind speed of the wind W that is generated by the wind force generation portion 61 on the basis of the wind speed of the wind W in the first wind force separating portion 70 or the second wind force separating portion 80, the separating of the magnetic bodies 101 and the non-magnetic bodies 102 by means of wind force can be performed under stable conditions.

In addition, the wind speed adjustment portion 400 further comprises a wind speed detection portion 401 that detects the wind speed of the wind W in the first wind force separating portion 70 or the second wind force separating portion 80. The wind speed adjustment portion 400 adjusts the wind speed of the wind W that is generated by the wind force generation portion 61 on the basis of the wind speed of the wind W that was detected by the wind speed detection portion 401.

According to such a configuration, it is possible to automatically adjust the wind speed of the wind W that is generated by the wind force generation portion 61 on the basis of the wind speed of the wind W that was detected by the wind speed detection portion 401.

In the above-mentioned first modification, the wind speed of the wind W was adjusted by adjusting the degree of opening of the damper. However, the wind speed of the wind W may alternatively be adjusted by adjusting the rotation speed of a fan in the dust collector.

In addition, in the above-mentioned first modification, the wind speed of the wind W was adjusted on the basis of the wind speed that was detected by the wind speed detection portion 401, but the present invention is not so limited.

For example, as illustrated in FIG. 4, when the degree, to which the amount of the mixture 100 and the ratio of magnetic bodies 101 to non-magnetic bodies 102 contained in the mixture 100 changes with the passage of time after the mixture 100 is loaded into the separation device 4B and then separating is initiated, is known, the wind speed adjustment portion 400 may adjust the wind speed of the wind W that is generated by the wind force generation portion 61 on the basis of preset maps and the like on the basis of the time that has passed.

That is, the wind speed adjustment portion 400 may adjust the wind speed of the wind W that is generated by the wind force generation portion 61 on the basis of the time that has passed since the initiation of the separating of the first separated objects 200 and the second separated objects 300 by means of wind force by the first wind force separating portion 70 or the second wind force separating portion 80.

According to such a configuration, there are cases when the degree, to which the amount of the mixture 100 and the ratio of magnetic bodies 101 to non-magnetic bodies 102 contained in the mixture 100 changes over time after the mixture 100 is loaded into the separation device 4B and then separating is initiated, is known. In such cases, by adjusting the wind speed on the basis of the time that has passed since the initiation of separating, the wind speed can be adjusted with a simple configuration without detecting the wind speed and the like.

Figure 5:
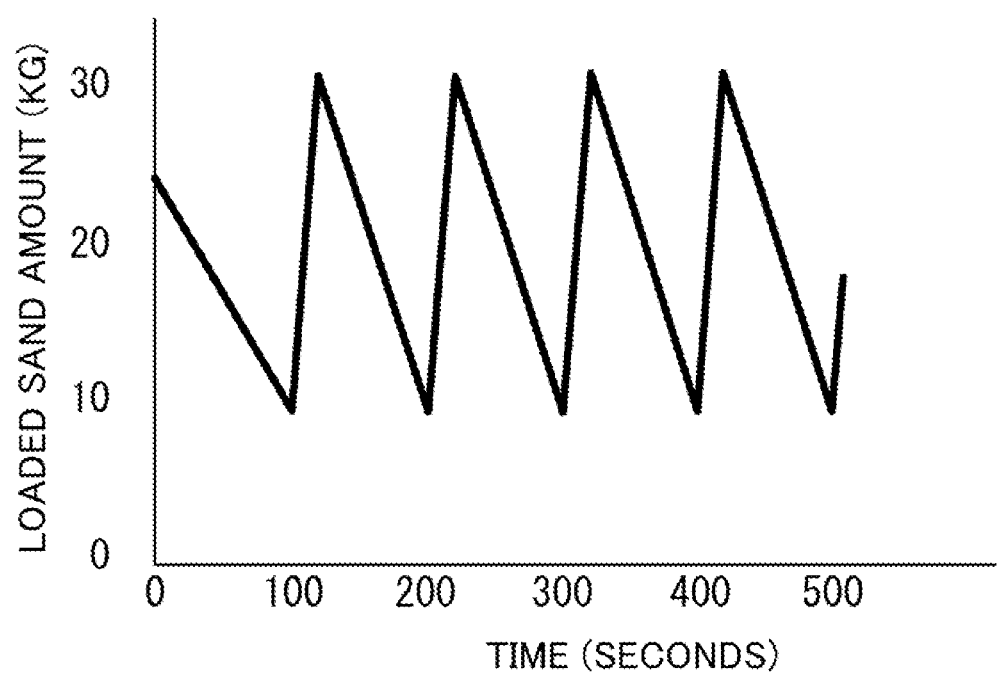
FIG. 5 is a drawing illustrating an example of a variation pattern in which the amount of non-magnetic bodies (sand) contained in a mixture repeatedly varies over time.

In addition, even when for example sequentially and continuously blast-processing a plurality of workpieces 10, if the variation pattern of the amount of (the non-magnetic bodies 102 contained in) the mixture 100 relative to the amount of time that has passed, such as that illustrated in FIG. 5, is known, the wind speed adjustment portion 400 may be configured to sequentially repeat the adjustment of the wind speed of the wind W that is generated by the wind force generation portion 61 relative to the amount of time that has passed on the basis of preset maps and the like.

Second Modification

Figure 6:
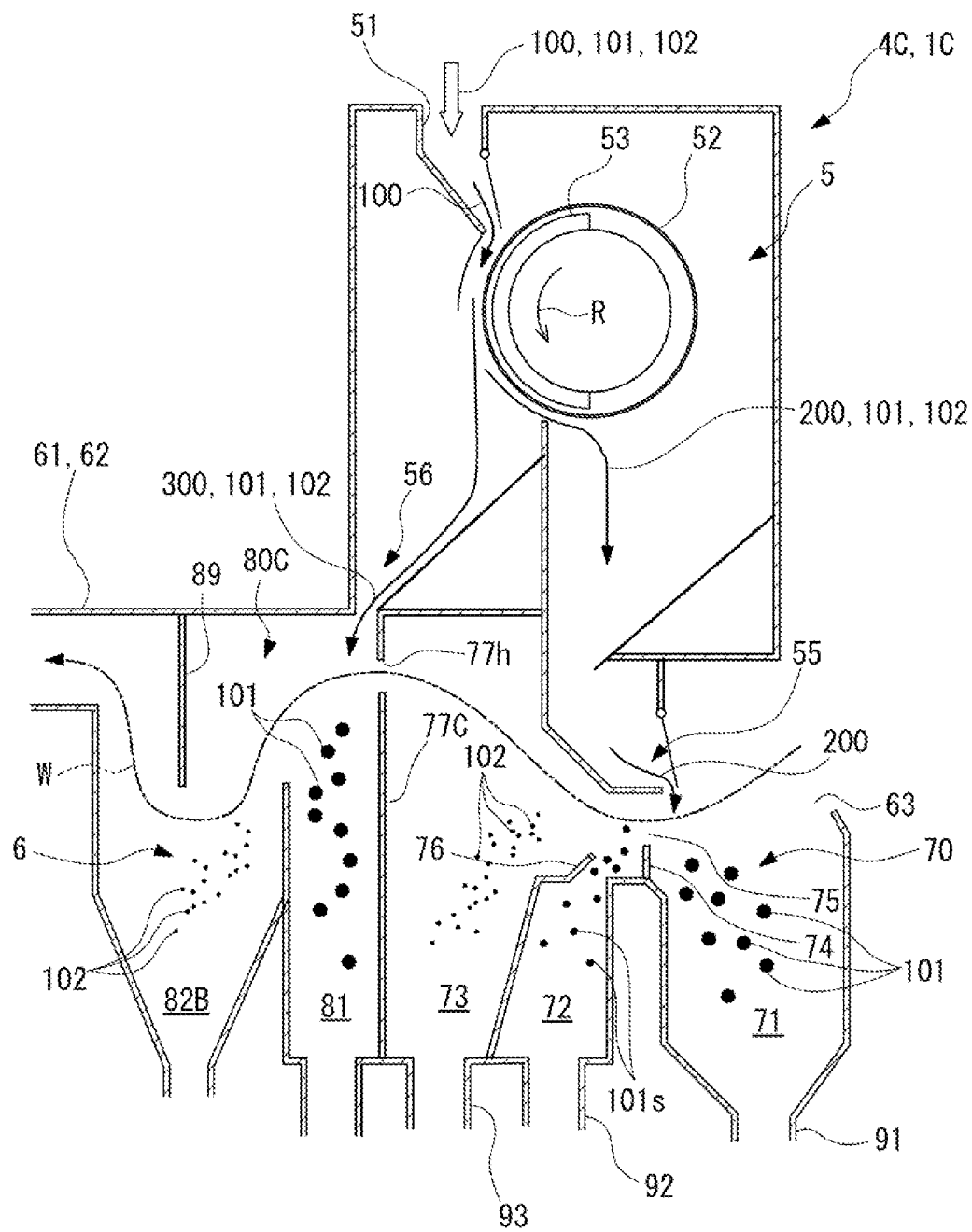
FIG. 6 is a cross-sectional view illustrating the overall configuration of a separation device according to a second modification of the present embodiment.

In addition, as illustrated in FIG. 6, in a separation device 4C of blast-processing equipment 1C, a partition plate 77C may be provided, as a wall, so as to completely section off the first wind force separating portion 70 from a second wind force separating portion 80C. A communicating hole 77h through which the wind W flows from the first wind force separating portion 70 to the second wind force separating portion 80C is formed at the upper portion of the partition plate 77C. Thus, in the first wind force separating portion 70, the wind W flows obliquely upward, similar to the above-mentioned embodiment, from the inlet portion 75 toward the communicating hole 77h.

In the second wind force separating portion 80C, the suction duct 62 is provided at substantially the same height as that of the communicating hole 77h. A barrier 89 is provided above the second non-magnetic body recovery portion 82B such that the non-magnetic bodies 102 contained in the second separated objects 300 do not reach the suction duct 62.

Third Modification

Figure 7:
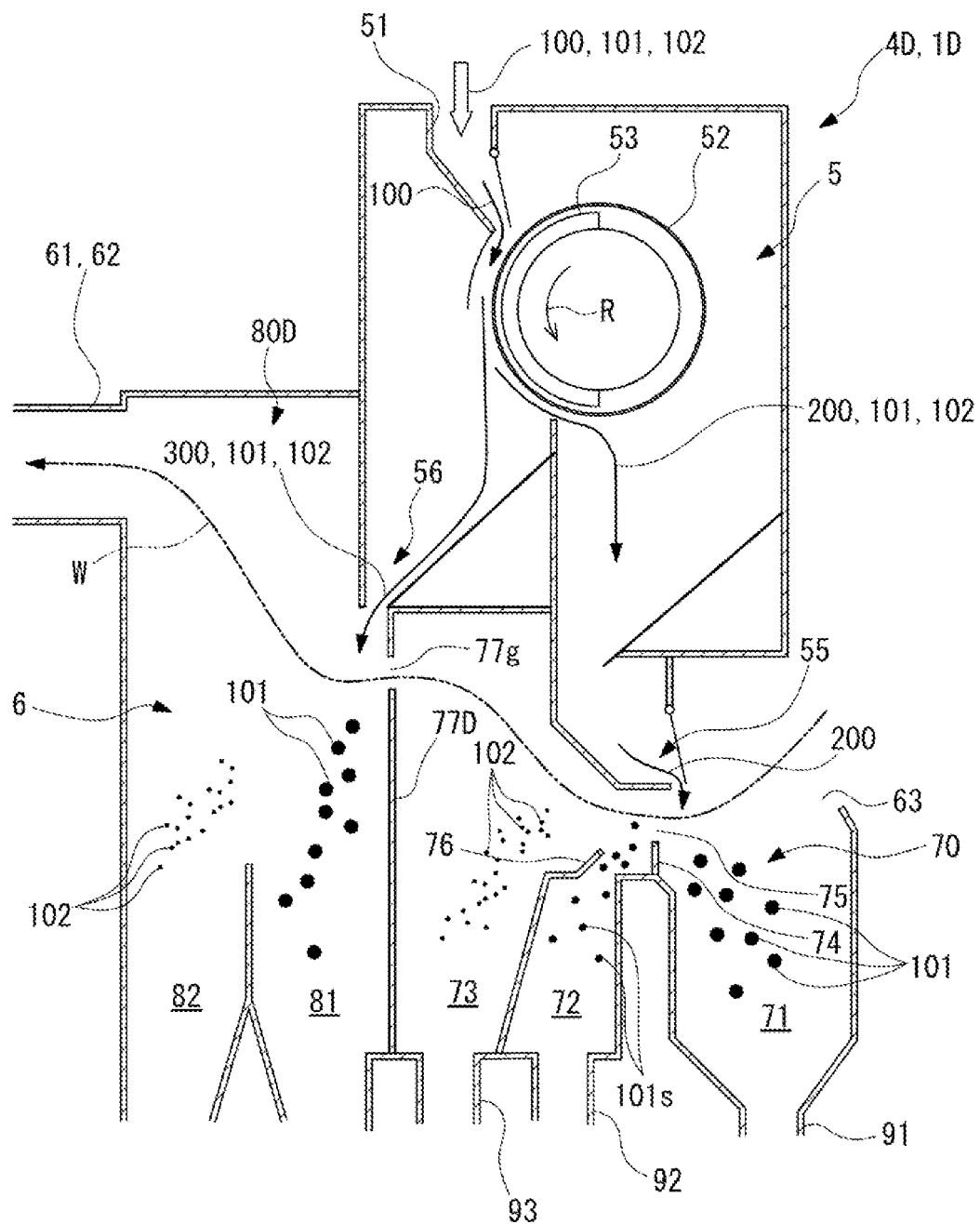
FIG. 7 is a cross-sectional view illustrating the overall configuration of a separation device according to a third modification of the present embodiment.

In addition, as illustrated in FIG. 7, in a separation device 4D of blast-processing equipment 1D, a partition plate 77D may be provided, as a wall, so as to completely section off the first wind force separating portion 70 from a second wind force separating portion 80D. A communicating hole 77g through which the wind W flows from the first wind force separating portion 70 to the second wind force separating portion 80D is formed at the upper portion of the partition plate 77D. The suction duct 62 is disposed at a higher location than the communicating hole 77g. Thus, the magnetic bodies 102 contained in the second separated objects 300 are inhibited from reaching the suction duct 62.

Fourth Modification

Figure 8:
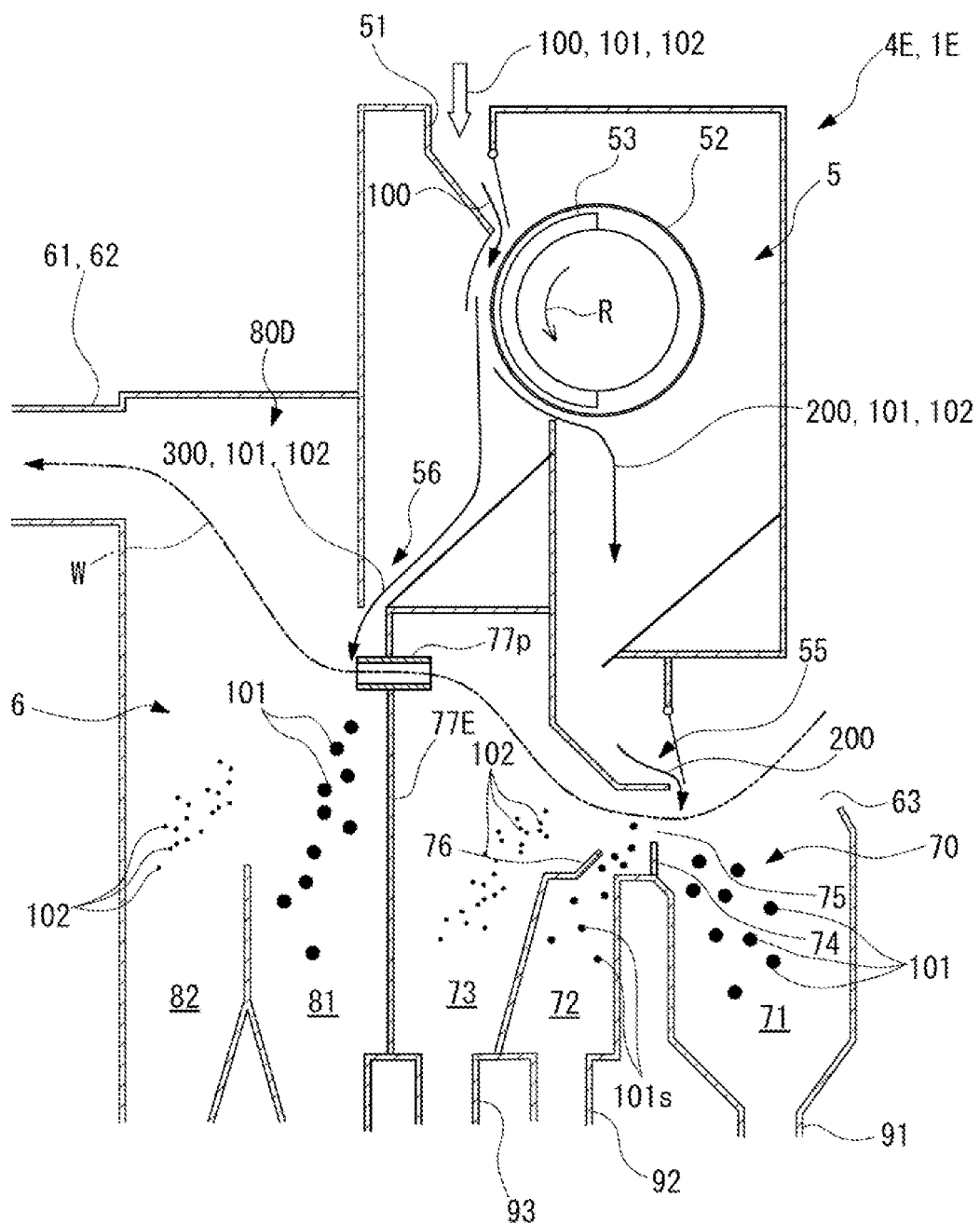
FIG. 8 is a cross-sectional view illustrating the overall configuration of a separation device according to a fourth modification of the present embodiment.

In addition, as illustrated in FIG. 8, in a separation device 4E of blast-processing equipment 1E, a partition plate 77E may be provided, as a wall, so as to completely section off the first wind force separating portion 70 from the second wind force separating portion 80D. A pipe 77p that communicates the first wind force separating portion 70 with the second wind force separating portion 80D is disposed at the upper portion of the partition plate 77E. This pipe 77p makes it possible to rectify the wind W that flows from the first wind force separating portion 70 into the second wind force separating portion 80D.

In addition, in the above-mentioned embodiment and modifications, in the second separated object supply portion 56 of the magnetic force separating mechanism 5, the second separated objects 300 that are discharged onto one side of the rotating drum 52 were supplied to the second wind force separating portions 80, 80B, 80C, and 80D, but the present invention is not so limited. For example, a configuration is contemplated in which the magnetic force separating mechanism 5 discharges the second separated objects 300 onto both sides of the rotating drum 52, that is, into both the naturally falling area P side and the conveyed falling area Q side in FIG. 2, while discharging the first separated objects 200 below the rotating drum 52. In such a case, the second separated objects 300 that are discharged into the conveyed falling area Q side may be guided to the naturally falling area P side, mixed together with the second separated objects 300 that are discharged into the naturally falling area P side, and then supplied from the second separated object supply portion 56 to the second wind force separating portions 80, 80B, 80C, and 80D.

Fifth Modification

For example, in the configuration that was described as the above-mentioned embodiment using FIG. 2, there is a possibility that the magnetic bodies 101 will become mixed in with the non-magnetic bodies 102 by the magnetic bodies 101 entering the first non-magnetic body recovery portion 73. This can occur, for example, by the magnetic bodies 101 contained in the second separated objects 300, which are supplied from the second separated object supply portion 56 to the second wind force separating portion 80, colliding with each other while falling from the second separated object supply portion 56 and being propelled toward the first wind force separating portion 70 side.

Figure 9:
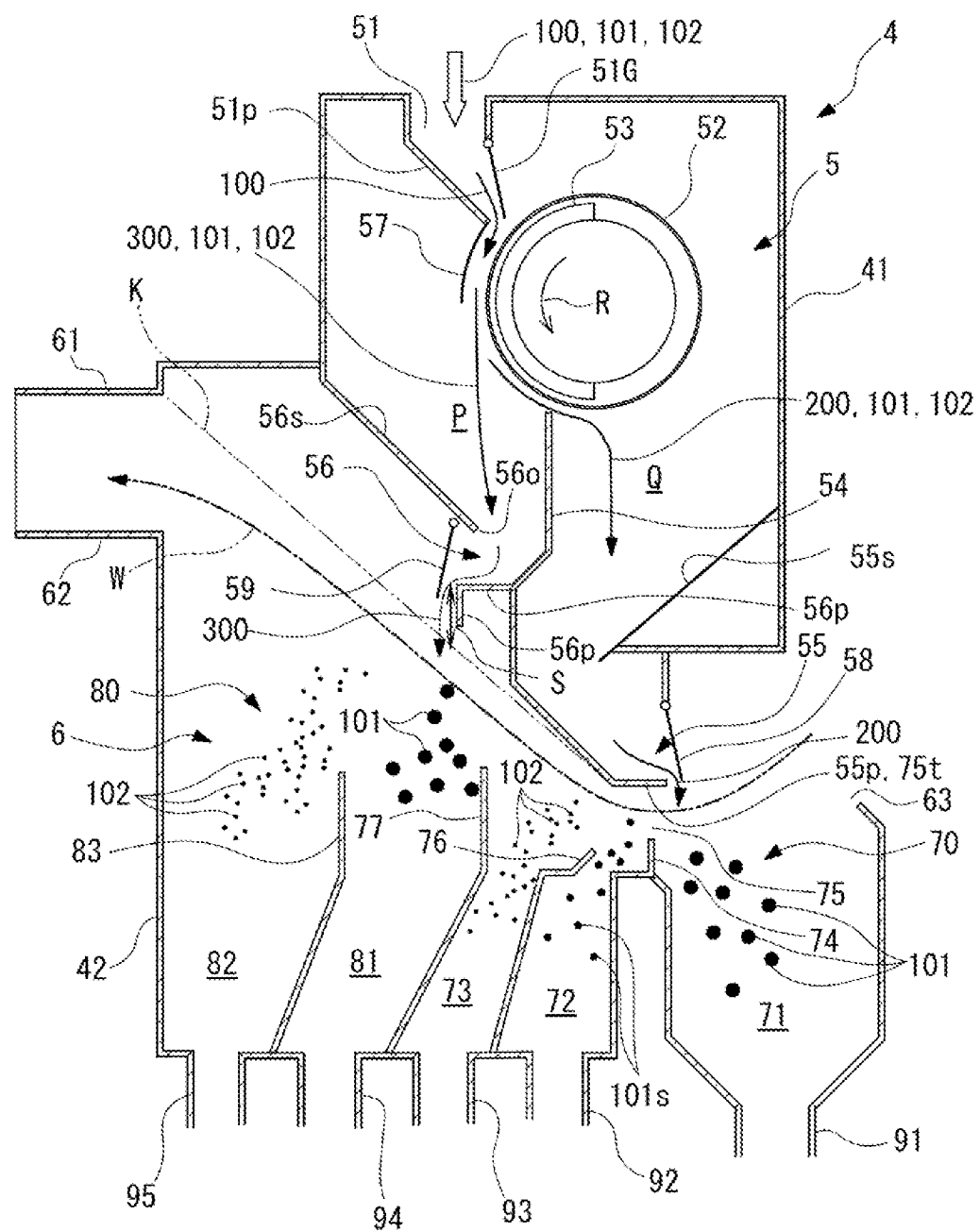
FIG. 9 is a cross-sectional view illustrating the overall configuration of a separation device according to a fifth modification of the present embodiment.

In the present modification, as illustrated in FIG. 9, a backflow inhibiting plate 56p extending downward is provided at the lower side of the opening 56o of the second separated object supply portion 56. The movement of the second separated objects 300 upstream in the flow direction of the wind W is inhibited by the second separated objects 300 contacting the backflow inhibiting plate 56p.

That is, in the present modification, the second separated object supply portion 56 has an opening 56o that opens from the magnetic force separating mechanism 5 toward the downstream side in the flow direction of the wind W. The second separated objects 300 are supplied from the magnetic force separating mechanism 5 through the opening 56o to the second wind force separating portion 80. The backflow inhibiting plate 56p extending downward and inhibiting the second separated objects 300 from moving upstream in the flow direction of the wind W is provided at the lower side of the opening 56o.

According to the configuration as described above, the magnetic bodies 101 contained in the second separated objects 300 can be inhibited from moving upstream in the flow direction of the wind W. Therefore, it is possible to inhibit the magnetic bodies 101 from mixing in with the non-magnetic bodies 102 that are discharged from the first non-magnetic body recovery portion 73.

In realizing the second separated object supply portion 56, other configurations can be contemplated aside from the form illustrated as FIG. 9. For example, it can be contemplated that the second separated object supply portion 56 is realized by means of a horizontal plate, an opening is provided in the horizontal plate, and then the second separated objects 300 that were deposited over the horizontal plate are dropped below from the opening. Alternatively, it can also be contemplated that the second separated object supply portion 56 is realized by means of a tubular body that is provided such that the axial direction thereof is in the vertical direction, and the second separated objects 300 are supplied from above through the tubular body while being guided downward.

However, in such cases, there is a possibility that the second separated objects 300 that are discharged from the second separated object supply portion 56 will move laterally while falling and, for example, the magnetic bodies 101 that would normally fall toward the second magnetic body recovery portion 81 will enter the first non-magnetic body recovery portion 73.

For example, when the second separated object supply portion 56 is realized by means of a horizontal plate, the magnetic bodies 101 would not steadily fall vertically downward. The second separated objects 300 that were deposited on the horizontal plate will, when moving toward the opening, more or less move laterally. Therefore, the magnetic bodies 101 that have reached the opening while moving laterally may be discharged downward from the opening while maintaining the lateral movement. Alternatively, there is a possibility that even if magnetic bodies 101 attempt to fall vertically downward, other laterally moving magnetic bodies 101 will collide therewith, resulting in the magnetic bodies 101 moving laterally.

In addition, when the second separated object supply portion 56 is realized by means of a tubular body, this could entail magnetic bodies 101 that are falling down the tubular body colliding with the inner wall of the tubular body and being reflected and, when being discharged downward from the tubular body, moving laterally.

For this reason, the configuration of the fifth modification illustrated as FIG. 9 is more desirable than such configurations in order to inhibit the magnetic bodies 101 contained in the second separated objects 300 from being mixed into the first non-magnetic body recovery portion 73.

In addition, needless to say, adjusting the shape and height of the first divider 74, the second divider 76, and the like is very effective for inhibiting the magnetic bodies 101 that are separated by the first wind force separating portion 70 and the second wind force separating portion 80 from being mixed into other recovery portions such as the small-diameter magnetic body recovery portion 72 and the first non-magnetic body recovery portion 73.

Therefore, it is more desirable to adjust the height and location of these dividers while employing the configuration illustrated as FIG. 9.

Other Modifications

Aside from the above, for example, the disposition of the wind force generation portion 61, the first wind force separating portion 70, and the second wind force separating portion 80 is not limited to the configurations shown in the above-mentioned embodiment and modifications and can be suitably modified. For example, the second wind force separating portion 80 may be provided upstream of the first wind force separating portion 70 such that the wind W that was generated by the wind force generation portion 61 is supplied from the second wind force separating portion 80 side to the first wind force separating portion 70 side.

In addition, as described previously, blasting abrasives 101 were illustrated as magnetic bodies in the above-mentioned embodiment and modifications, but the material, applications, and the like of the magnetic bodies are not limited. In addition, the non-magnetic bodies 102 may also be those that are produced not only by blast-processing but other treatments and processing.

In addition, in the above-mentioned embodiments, the case in which sand and magnetic particles are separated from granular bodies generated when molding sand is removed from products by blast-processing after casting were described. However, the present invention is not limited thereto. The separation device as described above can be favorably used not only for blast-processing but also when processing large amounts of articles to be processed. For example, the separation device can also be used to separate magnetic particles and non-magnetic particles (molding sand) from granular bodies generated by crushing casting flasks (sand molds). In addition, for example, the separation device can be used to separate magnetic particles and non-magnetic particles after fracturing slag generated in steelworks.

Aside from the above, it is possible to select whether to add or remove the configurations indicated in the above-mentioned embodiments and to appropriately modify the configurations to other configurations without departing from the spirit of the present invention.

REFERENCE SIGNS LIST 4, 4B, 4C, 4D, 4E Separation device
Magnetic force separating mechanism
First separated object supply portion
Second separated object supply portion
56o Opening
56p Backflow inhibiting plate
Wind force generation portion
Suction duct (suction portion)
First wind force separating portion
First magnetic body recovery portion
Small-diameter magnetic body recovery portion
First non-magnetic body recovery portion
Inlet portion
75t Upper end
77, 77C, 77D, 77E Partition plate
80, 80B, 80C, 80D Second wind force separating portion
Second magnetic body recovery portion
82, 82B Second non-magnetic body recovery portion
Flow path
100 Mixture
101 Magnetic bodies
101s Small-diameter magnetic bodies
102 Non-magnetic bodies
200 First separated objects
300 Second separated objects
400 Wind speed adjustment portion
401 Wind speed detection portion
K Imaginary line
S Gap
W Wind

What is claimed is:

1. A separation device that separates a mixture of magnetic bodies that are granular and non-magnetic bodies that are granular into the magnetic bodies and the non-magnetic bodies, the separation device comprising:
a magnetic force separating mechanism that separates the mixture into first separated objects mainly containing the magnetic bodies and also containing the non-magnetic bodies, and second separated objects mainly containing the non-magnetic bodies and also containing the magnetic bodies, by attracting the magnetic bodies from the mixture by means of magnetic force;
a wind force generation portion that generates wind force;
a first wind force separating portion that separates the first separated objects into the magnetic bodies and the non-magnetic bodies by means of the wind force; and
a second wind force separating portion that separates the second separated objects into the non-magnetic bodies and the magnetic bodies by means of the wind force,
the first wind force separating portion and the second wind force separating portion being disposed next to each other along a flow path of wind that is generated by the wind force generation portion.

2. The separation device according to claim 1, wherein:
the first wind force separating portion is disposed upstream in a flow direction of the wind relative to the second wind force separating portion.

3. The separation device according to claim 2, wherein:
the non-magnetic bodies have less mass than the magnetic bodies; and
the first wind force separating portion comprises:
a first magnetic body recovery portion that is disposed below a first separated object supply portion to which the first separated objects are supplied from the magnetic force separating mechanism and that recovers the magnetic bodies contained in the first separated objects;
a first non-magnetic body recovery portion that is disposed downstream in the flow direction of the wind relative to the first magnetic body recovery portion and that recovers the non-magnetic bodies contained in the first separated objects; and
a partition plate that is disposed downstream in the flow direction of the wind relative to the first non-magnetic body recovery portion and that partitions the first wind force separating portion from the second wind force separating portion.

4. The separation device according to claim 3, wherein:
the first wind force separating portion further comprises a small-diameter magnetic body recovery portion between the first magnetic body recovery portion and the first non-magnetic body recovery portion, the small-diameter magnetic body recovery portion recovering the magnetic bodies having a smaller particle diameter than the magnetic bodies recovered by the first magnetic body recovery portion and having more mass than the non-magnetic bodies recovered by the first non-magnetic body recovery portion.

5. The separation device according to claim 3, wherein:
the partition plate extends so as to protrude further upward, in an up-down direction, than an upper end of an inlet portion through which the wind flows from the first magnetic body recovery portion side to the first non-magnetic body recovery portion side.

6. The separation device according to claim 3, wherein:
a suction portion that sucks in air for generating wind force in the wind force generation portion is disposed downstream of and above the first wind force separating portion and the second wind force separating portion in the flow direction of the wind.

7. The separation device according to claim 6, wherein:
the second wind force separating portion comprises:
a second magnetic body recovery portion that is disposed below a second separated object supply portion to which the second separated objects are supplied from the magnetic force separating mechanism and that is downstream in the flow direction of the wind relative to the partition plate, the second magnetic body recovery portion recovering the magnetic bodies contained in the second separated objects; and
a second non-magnetic body recovery portion that is disposed downstream in the flow direction of the wind relative to the second magnetic body recovery portion and that recovers the non-magnetic bodies contained in the second separated objects.

8. The separation device according to claim 7, wherein:
the second separated object supply portion is disposed spaced apart by a gap defined, in the up-down direction, above an imaginary line linking an upper end of an inlet portion, through which the wind flows from the first magnetic body recovery portion side to the first non-magnetic body recovery portion side, and an upper portion of the suction portion.

9. The separation device according to claim 8, wherein:
the defined gap is set so as to be greater than or equal to a distance when a gap between the magnetic bodies that are continuously falling at intervals of a reference time becomes ten times a distance corresponding to a maximum particle diameter of the magnetic bodies, the reference time being defined as a time for the magnetic bodies to freely fall a distance corresponding to the maximum particle diameter of the magnetic bodies.

10. The separation device according to claim 7, wherein:
the second separated object supply portion has an opening that opens from the magnetic force separating mechanism toward the downstream side in the flow direction of the wind, and the second separated objects are supplied from the magnetic force separating mechanism through the opening to the second wind force separating portion; and
a backflow inhibiting plate extending downward and inhibiting the second separated objects from moving upstream in the flow direction of the wind is provided at a lower side of the opening.

11. The separation device according to claim 2, wherein:
a cross-sectional area of the flow path of the wind gradually increases downstream from the first wind force separating portion in the flow direction of the wind.

12. The separation device according to claim 1, further comprising:
a wind speed adjustment portion that adjusts a wind speed of the wind that is generated by the wind force generation portion on the basis of the wind speed of the wind in the first wind force separating portion or the second wind force separating portion.

13. The separation device according to claim 12, wherein:
the wind speed adjustment portion further comprises a wind speed detection portion that detects the wind speed of the wind in the first wind force separating portion or the second wind force separating portion; and
the wind speed adjustment portion adjusts the wind speed of the wind that is generated by the wind force generation portion on the basis of the wind speed of the wind that was detected by the wind speed detection portion.

14. The separation device according to claim 12, wherein:
the wind speed adjustment portion adjusts the wind speed of the wind that is generated by the wind force generation portion on the basis of a time that has passed since initiation of separating of the first separated objects and the second separated objects by means of wind force by the first wind force separating portion or the second wind force separating portion.

15. The separation device according to claim 1, wherein:
the magnetic bodies are blasting abrasives projected at a workpiece and the non-magnetic bodies are molding sand.

* * * * *